Patented Jan. 14, 1930

1,743,632

UNITED STATES PATENT OFFICE

SAMUEL LEWIS SUMMERS, OF FORT WASHINGTON, PENNSYLVANIA

METHYLENE-DISALICYLIC ACID DERIVATIVE

No Drawing.   Application filed October 12, 1928.   Serial No. 312,200.

My invention relates to organic compounds and their manufacture and is especially concerned with novel condensation products of pyruvic acid with the di(aminobenzyl) ethers of methylene-disalicylic amide, useful for pharmaceutical purposes, as hereinafter described.

My products may be prepared as follows:

Starting with methylene-disalicylic acid, the first step is esterification, preferably by ethyl alcohol, though other alcohols may be used. As the alcohol is replaced in the next step, the particular alcohol employed is of no influence on the final product. The esterification may be accomplished as follows, though I do not limit myself to this particular method:

Dissolve 288 pounds of methylene-disalicylic acid in 150 pounds of ethyl alcohol and slowly add to this solution, keeping the temperature below 75° C., 100 pounds of concentrated sulphuric acid. When all of this has been added, heat to 150° C. under a reflux condenser for two hours. The essential product is the diethyl ester of methylene-disalicylic acid:

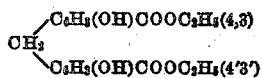

This is freed from sulphuric acid by washing with water.

The second main step is to convert this ester into the corresponding amide. One method of accomplishing this is as follows:

348 pounds of the above described ester is mixed with 200 pounds of strong aqueous ammonia ("concentrated" or 28%) and heated in an autoclave for four hours to a temperature of 110° C. The excess of ammonia, the water and the alcohol liberated during the reaction are gotten rid of, leaving methylene-disalicylamide, $$CH_2(C_6H_3(OH)CONH_2)_2,$$

as the essential product. It is immaterial whether this amide is obtained through the ester as described or from methylene-disalicylic acid by some other method.

The third main step is to substitute nitrobenzyl groups in the two hydroxyl groups of the above described amide. One practicable way of accomplishing this, to which I do not limit myself, is as follows:

286 pounds of methylene-disalicyl-amide is intimately mixed with 345 pounds of p-nitrobenzyl chloride and 250 pounds of sodium carbonate and heated for twenty-four hours to 130° C. The essential product is a di(nitrobenzyl) ether of methylene-disalicyl amide:

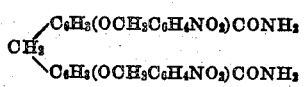

The isomeric ortho and meta nitrobenzyl chlorides may be used instead of the para with the production of closely resembling isomeric products. These go through the subsequent reactions in the same way and give final products which are interchangeable for pharmaceutical purposes.

The fourth main step is to reduce the two nitrobenzyl groups of the above described product to amino groups. This may be effected by the use of various reducing agents, but one way is as follows:

Mix 556 pounds of the above described di(nitrobenzyl) substitution product with 400 pounds of free metallic zinc preferably in the form of dust, and 1800 pounds of hydrochloric acid. After the heat of the spontaneous chemical reaction has subsided the mass is heated to 100° C. and maintained at that temperature for eight hours. The mixture is made slightly alkaline by the addition of ammonia water, which causes the separation of the desired diamino derivative, which is filtered off and washed with water to free it from the zinc chloride produced in the reaction. The product is dissolved in alcohol and freed from any zinc salts that may remain by saturating this solution with hydrogen sulphide. The alcohol is eliminated by evaporation, which leaves the essential product which is a di(aminobenzyl) ether of methylene-disalicyl amide:

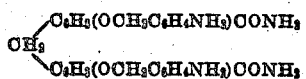

The fifth main step is to introduce pyruvyl groups into the four $-NH_2$ groups of the above described compound. One way of accomplishing this, to which I do not limit myself, is as follows:

Heat 496 pounds of the di(aminobenzyl) ether of methylene-disalicyl amide with 350 pounds of pyruvic acid, previously dissolved in alcohol, to 130° for eight hours. The essential product is a condensation product having the structural formula:

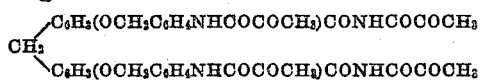

This is a crystalline solid, insoluble in water but soluble in alcohol. In case the reaction is not pushed to completion, less than four molecules of pyruvic acid may react, giving products containing two or three pyruvyl groups instead of four. These products are similar in properties and may be used for the same pharmaceutical purposes.

Having thus described my invention, I claim:

The hereindescribed condensation product of a di(aminobenzyl) ether of methylene-disalicyl amide with pyruvic acid, typified by the formula

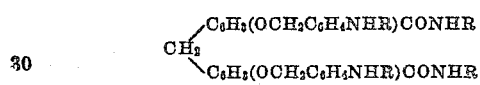

wherein R may represent the pyruvyl group or hydrogen, but having at least two R's as pyruvyl groups, and insoluble in water but soluble in alcohol.

In testimony whereof, I have hereunto signed my name at Ambler, Pennsylvania, this 9th day of October, 1928.

SAMUEL LEWIS SUMMERS.